(12) United States Patent
Won

(10) Patent No.: US 11,872,857 B2
(45) Date of Patent: Jan. 16, 2024

(54) LEAF SPRING DEVICE FOR A VEHICLE SUSPENSION SYSTEM

(71) Applicant: HYUNDAI MOBIS CO., LTD., Seoul (KR)

(72) Inventor: Sung Jin Won, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/088,101

(22) Filed: Dec. 23, 2022

(65) Prior Publication Data

US 2023/0356553 A1 Nov. 9, 2023

(30) Foreign Application Priority Data

May 9, 2022 (KR) .......................... 10-2022-0056496

(51) Int. Cl.
*B60G 11/08* (2006.01)
*B60G 11/12* (2006.01)
*B60G 7/00* (2006.01)

(52) U.S. Cl.
CPC .............. *B60G 11/08* (2013.01); *B60G 7/001* (2013.01); *B60G 11/12* (2013.01); *B60G 2202/114* (2013.01); *B60G 2204/121* (2013.01); *B60G 2204/45* (2013.01); *B60G 2206/7101* (2013.01); *B60G 2206/73* (2013.01)

(58) Field of Classification Search
CPC ........ B60G 11/08; B60G 7/001; B60G 11/12; B60G 2202/114; B60G 2204/121; B60G 2204/45; B60G 2206/7101; B60G 2206/73
See application file for complete search history.

(56) References Cited

U.S. PATENT DOCUMENTS

| | | | | |
|---|---|---|---|---|
| 582,492 | A * | 5/1897 | Swan | B60G 11/12 267/271 |
| 3,159,389 | A * | 12/1964 | Clary | B60G 11/02 267/49 |
| 3,204,944 | A * | 9/1965 | Brownyer | F16F 1/02 267/47 |
| 3,257,123 | A * | 6/1966 | Giovinazzo | B60G 11/36 267/230 |
| 4,468,014 | A * | 8/1984 | Strong | F16F 1/22 267/47 |
| 6,189,904 | B1 * | 2/2001 | Gentry | F16F 1/368 267/47 |
| 9,073,400 | B2 * | 7/2015 | Perri | B60G 7/008 |
| 9,162,546 | B2 * | 10/2015 | Girelli Consolaro | B60G 21/0551 |
| 10,807,426 | B2 * | 10/2020 | Girelli Consolaro | B60G 3/20 |
| 11,267,303 | B2 * | 3/2022 | Senoo | B60G 3/20 |
| 2003/0234506 | A1 * | 12/2003 | Yokoyama | F16F 1/20 280/124.171 |

(Continued)

FOREIGN PATENT DOCUMENTS

KR 10-1786090 B1 10/2017

*Primary Examiner* — Paul N Dickson
*Assistant Examiner* — Shams Dhanani
(74) *Attorney, Agent, or Firm* — NSIP Law

(57) ABSTRACT

A leaf spring device for a suspension system for a vehicle a including a leaf spring unit, an impact absorbing unit connected to the leaf spring unit and configured to absorb an impact generated by a motion of the leaf spring unit, and a lower arm support unit configured to accommodate the impact absorbing unit, the lower arm support unit being mounted on a lower arm.

15 Claims, 7 Drawing Sheets

(56) References Cited

U.S. PATENT DOCUMENTS

2016/0347139 A1* 12/2016 Drabon .................... B60G 9/00
2019/0176554 A1* 6/2019 Meier ................ B60G 17/0157

* cited by examiner

US 11,872,857 B2

LEAF SPRING DEVICE FOR A VEHICLE SUSPENSION SYSTEM

CROSS-REFERENCE TO RELATED APPLICATION

This application claims the benefit under 35 U.S.C. § 119(a) of priority to Korean Patent Application No. 10-2022-0056496 filed on May 9, 2022 in the Korean Intellectual Property Office, the entire disclosure of which is incorporated herein by reference for all purposes.

BACKGROUND

Field

The present disclosure relates to a leaf spring device for a suspension system for a vehicle, and more particularly to, a leaf spring device for a suspension system for a vehicle, which is capable of absorbing and reducing transverse displacement.

Description of the Related Art

Recently, to reduce a weight and height of a vehicle, there is an increasing use of a transversal composite leaf spring applied to a suspension system for a vehicle.

A central portion of the transversal leaf spring is fixedly mounted on a member, and two opposite ends of the transversal leaf spring are connected to an axle or a lower arm and serve as springs in respect to motions of wheels.

In the related art, at the time of designing the leaf spring, it is possible to implement the existing characteristics of a single leaf spring by designing a shape of the leaf spring so that the leaf spring has the same spring constant as the existing coil spring. However, when the leaf spring is connected to a chassis of the vehicle and operated systematically, the spring characteristics of the leaf spring increase because of mechanical limits when the leaf spring performs the motion.

The transverse displacement needs to be absorbed without friction during the arc motion of the wheel. However, in the existing structure, because the structure for connecting the spring and the lower arm or axle is a solid mounting structure, the transverse displacement and transverse force increase the spring characteristics.

In the era of electric vehicles and autonomous vehicles, the application of transversal composite leaf springs that contribute to the reduction in weight of vehicle is increasing. However, there is a problem in that the spring characteristics vary because of the transverse displacement during the motion of the wheel. Therefore, there is a need to solve the problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a leaf spring device for a suspension system for a vehicle, the leaf spring device including a leaf spring unit, an impact absorbing unit connected to the leaf spring unit and configured to absorb an impact generated by a motion of the leaf spring unit, and a lower arm support unit configured to accommodate the impact absorbing unit, the lower arm support unit being mounted on a lower arm.

The impact absorbing unit may include a plurality of plate units disposed to be stacked, one or more bushing units disposed between adjacent plate units of the plurality of plate units and mounted on the lower arm support unit, and a fastening rod configured to penetrate the plurality of plate units, the one or more bushing units, and the leaf spring unit.

The impact absorbing unit further may also include a stopper mounted on the fastening rod and configured to prevent the leaf spring unit from separating from the fastening rod.

The plurality of the plate units may also include a first plate and a second plate disposed above the first plate and spaced apart from the first plate. The one or more bushing units may also include a first bushing disposed between the first plate and the second plate.

The plurality of plate units may also include a third plate disposed above the second plate and spaced apart from the second plate, the third plate being configured to come into contact with the leaf spring unit. The one or more bushing units may also include a second bushing disposed between the second plate and the third plate.

A height of the first bushing may be equal to or greater than a height of the lower arm.

The lower arm support unit may also include a lower arm support body part mounted on the lower arm and including a bushing accommodation part provided therein, the bushing accommodation part being configured to accommodate the first bushing, and an opening part formed in the lower arm support body part and opened to an outside of the bushing accommodation part.

The lower arm support body part may also include a pair of bushing support parts, the pair of bushing support parts being concavely formed between the bushing accommodation part and the opening part and configured to support a circumferential surface of the first bushing.

A distance between the pair of bushing support parts facing each other may be smaller than a maximum inner diameter of the bushing accommodation part and a maximum inner diameter of the opening part.

An outer diameter of the first plate and an outer diameter of the second plate are larger than a maximum inner diameter of the bushing accommodation part.

The opening part may include a plurality of opening parts and the plurality of opening parts are disposed to face each other to enclose the bushing accommodation part.

The first bushing may be elastically deformable toward the opening part in a state in which the first bushing is accommodated in the bushing accommodation part.

An inner portion of the lower arm support body part may include an elastically deformable material.

An outer portion of the lower arm support body part may include a metallic material and the outer portion may be coupled to the lower arm.

The plurality of plate units may also include a metallic material and the one or more bushing units may also include an elastically deformable material.

Figure 1:
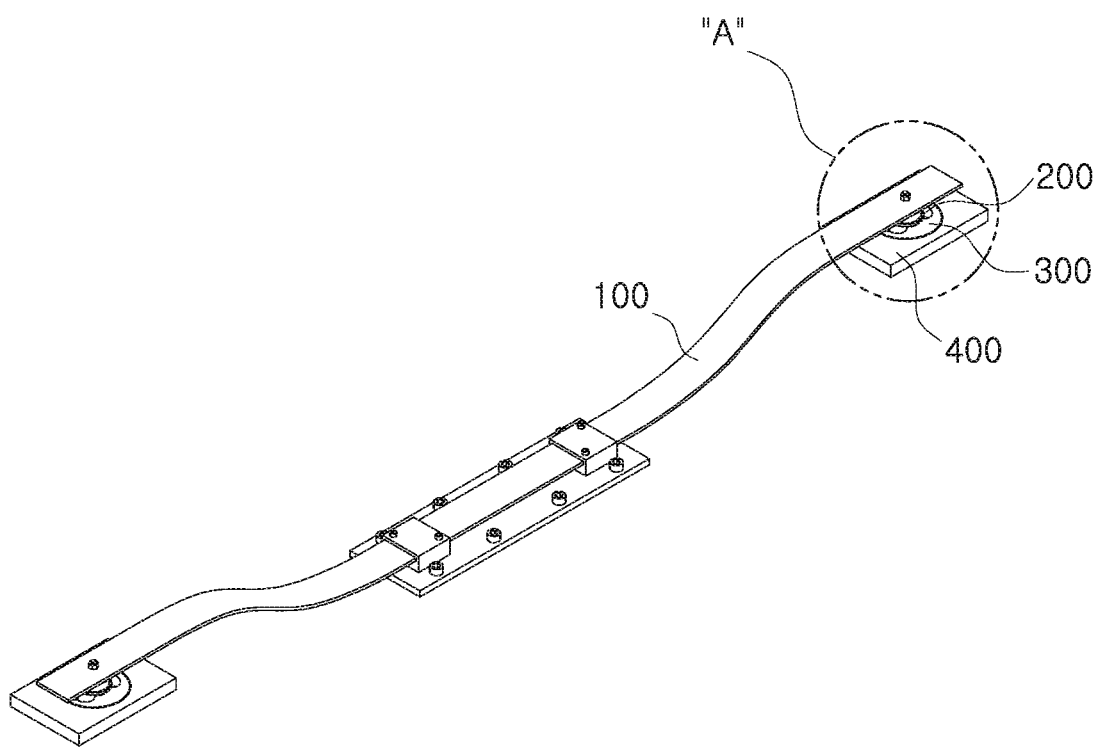
FIG. 1 is a perspective view schematically illustrating a leaf spring device for a suspension system for a vehicle according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
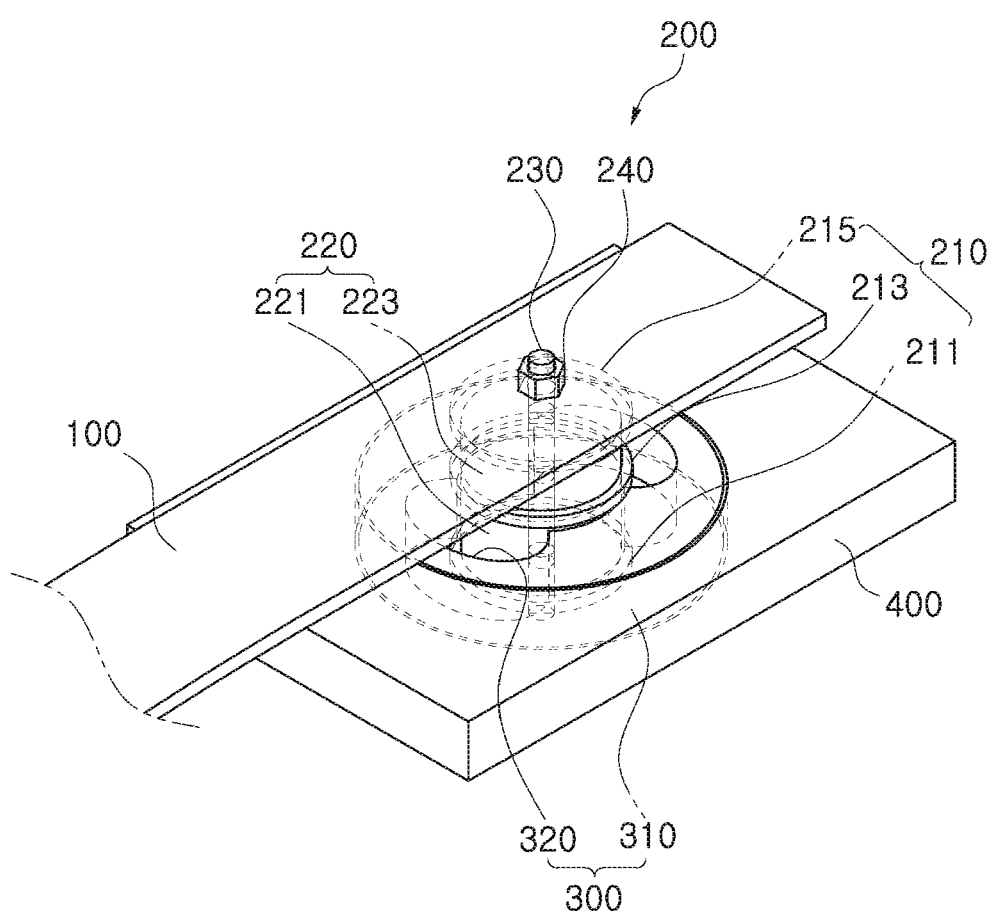
FIG. 2 is a partially enlarged perspective view schematically illustrating part "A" illustrated in FIG. 1.
Figure 3:
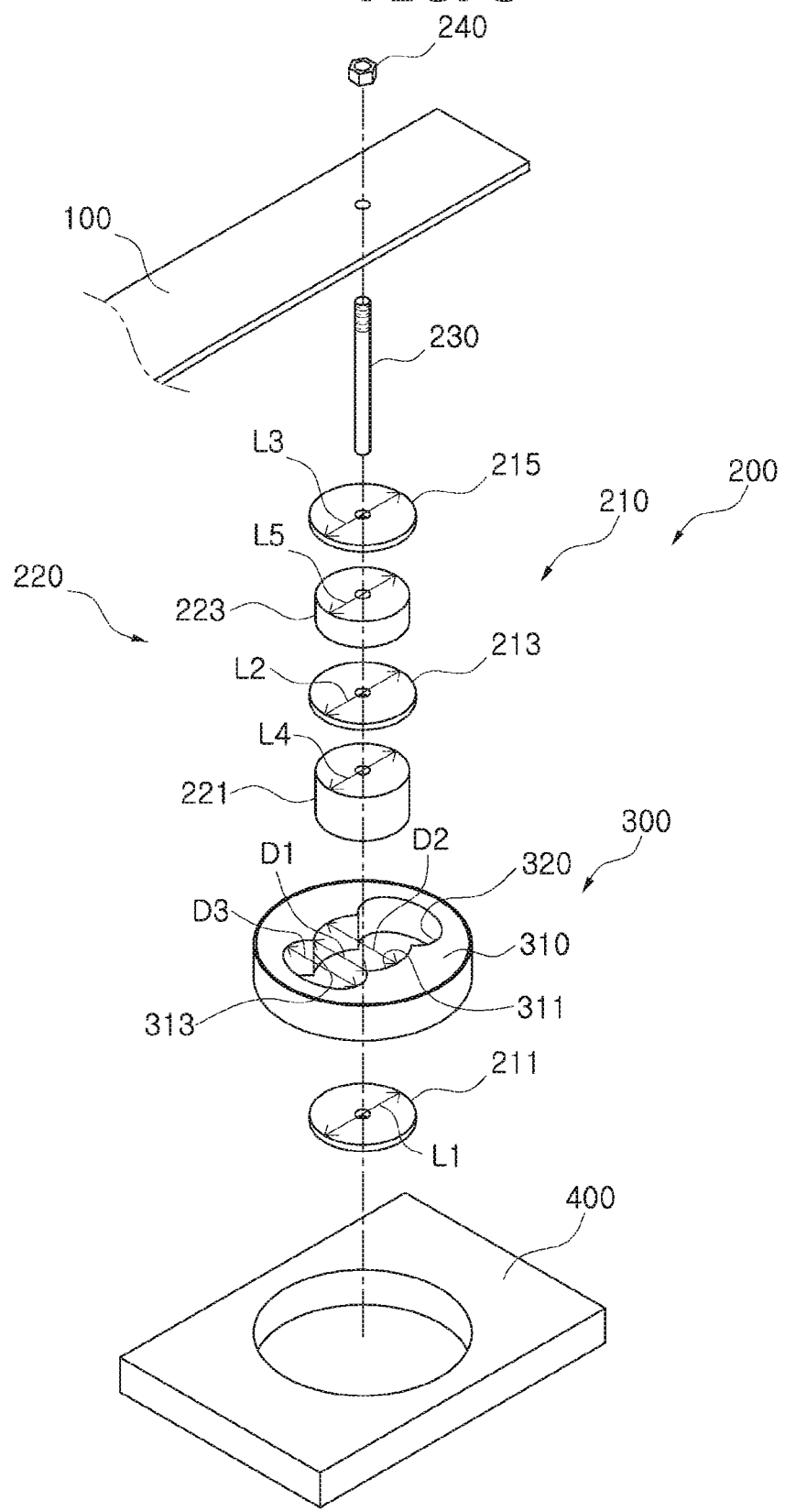
FIG. 3 is an assembled perspective view schematically illustrating the leaf spring device for a suspension system for a vehicle according to the embodiment of the present disclosure.
Figure 4:
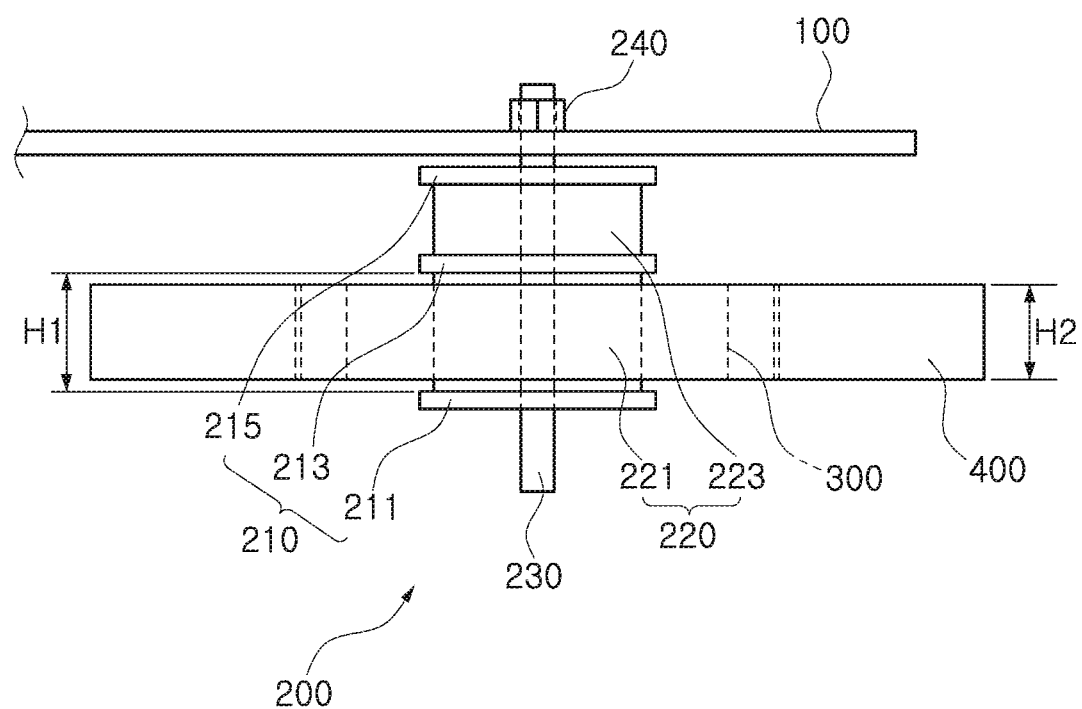
FIG. 4 is a front view schematically illustrating the leaf spring device for a suspension system for a vehicle according to the embodiment of the present disclosure.
Figure 5:
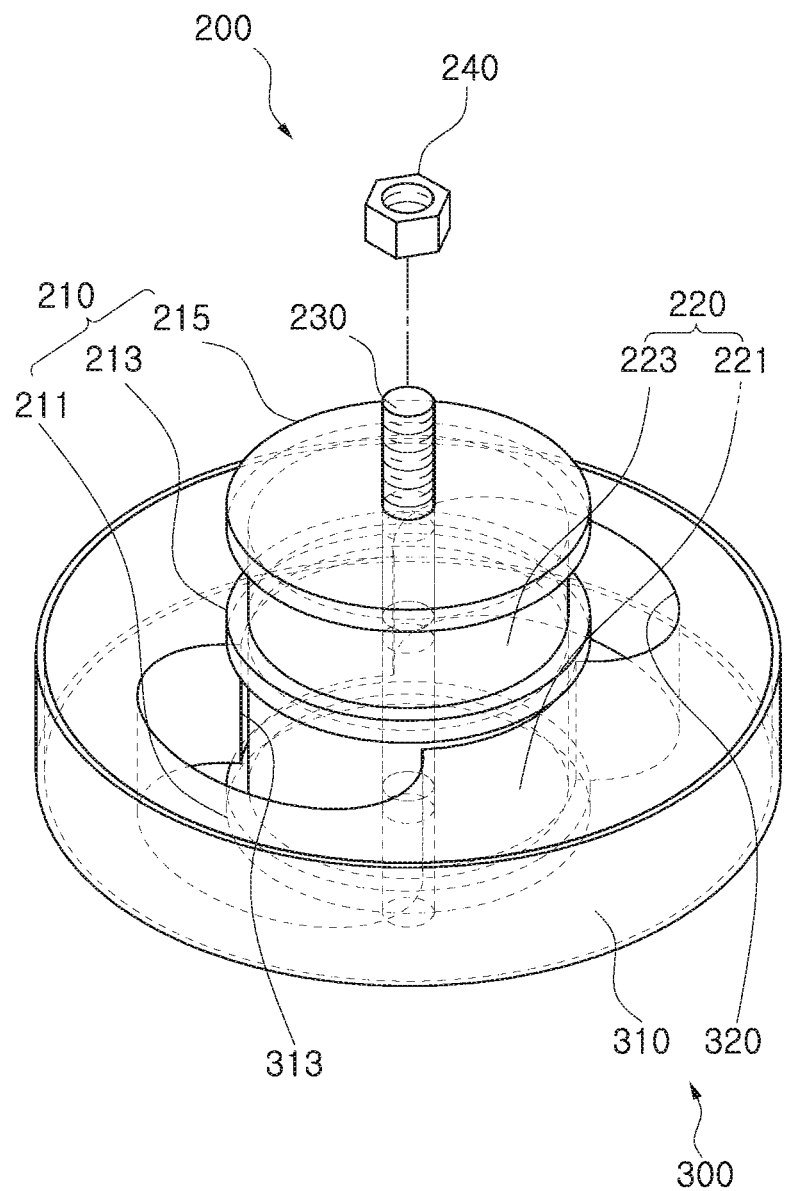
FIG. 5 is a perspective view schematically illustrating the main configuration of the leaf spring device for a suspension system for a vehicle according to the embodiment of the present disclosure.
Figure 6:
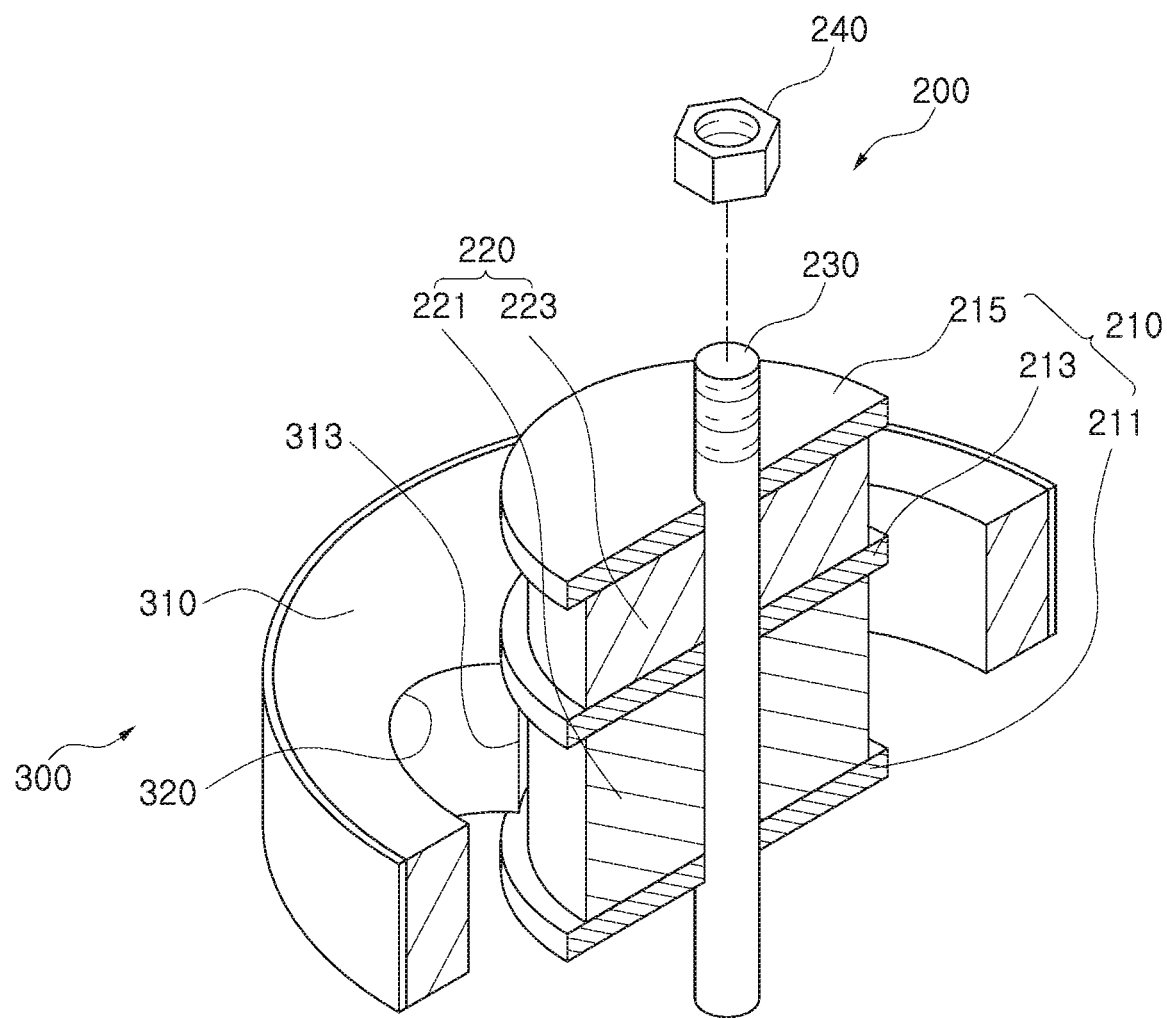
FIG. 6 is a partially cut-away perspective view schematically illustrating the main configuration of the leaf spring device for a suspension system for a vehicle according to the embodiment of the present disclosure.
Figure 7:
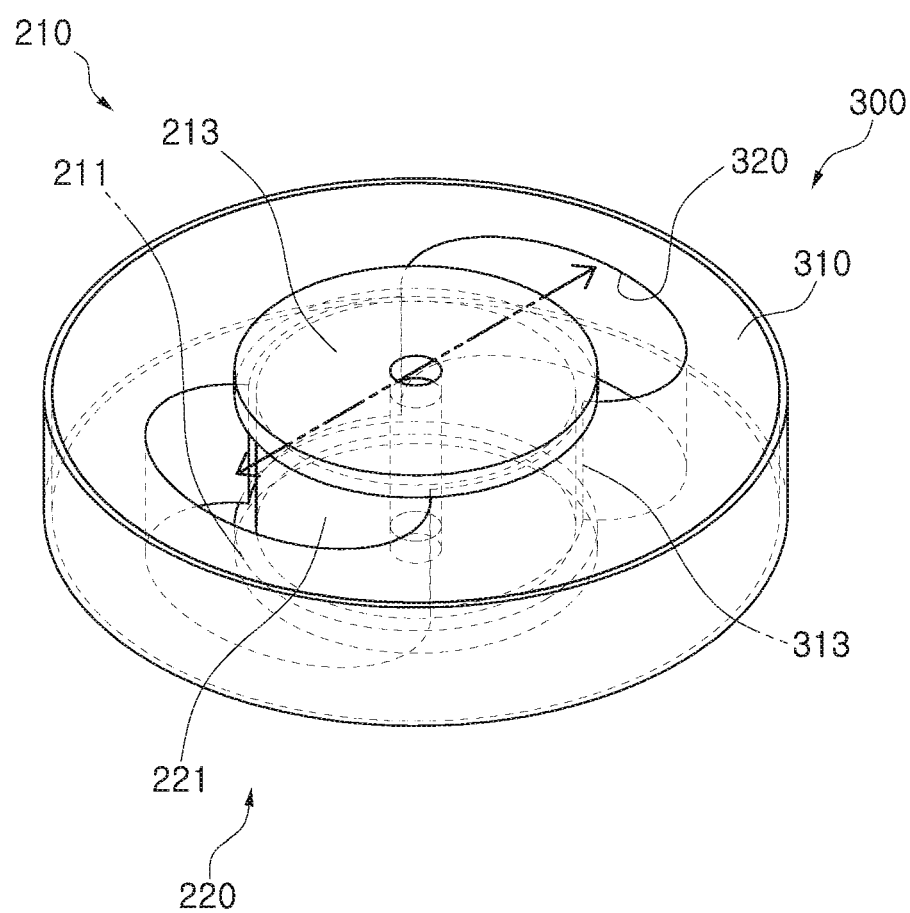
FIG. 7 is a perspective view schematically illustrating a lower side of a bushing unit and a lower arm support unit in the leaf spring device for a suspension system for a vehicle according to the embodiment of the present disclosure.

FIG. 1 is a perspective view schematically illustrating a leaf spring device for a suspension system for a vehicle according to an embodiment of the present disclosure, FIG. 2 is a partially enlarged perspective view schematically illustrating part "A" illustrated in FIG. 1, FIG. 3 is an assembled perspective view schematically illustrating the leaf spring device for a suspension system for a vehicle according to the embodiment of the present disclosure, FIG. 4 is a front view schematically illustrating the leaf spring device for a suspension system for a vehicle according to the embodiment of the present disclosure, FIG. 5 is a perspective view schematically illustrating the main configuration of the leaf spring device for a suspension system for a vehicle according to the embodiment of the present disclosure, FIG. 6 is a partially cut-away perspective view schematically illustrating the main configuration of the leaf spring device for a suspension system for a vehicle according to the embodiment of the present disclosure, and FIG. 7 is a perspective view schematically illustrating a lower side of a bushing unit and a lower arm support unit in the leaf spring device for a suspension system for a vehicle according to the embodiment of the present disclosure.

Referring to FIGS. 1 to 7, a leaf spring device for a suspension system for a vehicle according to an embodiment of the present disclosure includes a leaf spring unit 100, impact absorbing units 200, and lower arm support units 300.

The impact absorbing unit 200 is connected to the leaf spring unit 100. In the embodiment, the impact absorbing unit 200 is coupled to an end side of the leaf spring unit 100. The leaf spring unit 100 is exemplarily described as being a transversal leaf spring unit, but the present disclosure is not limited thereto. Therefore, the leaf spring unit 100 may be modified to another modifiable example.

The leaf spring unit 100 may be made of a composite material having several substances. The leaf spring unit 100 may be made of a material made by soaking a high-strength fiber material such as glass fiber, carbon fiber, or aramid fiber in plastic and then curing the fiber material. The leaf spring unit 100 may include a material made by reinforcing a basic material (matrix) such as polymer, metal, carbon, or ceramic with fibers, thread-shaped crystals, micro-dispersion particles, and the like.

In comparison with a metallic leaf spring unit, the leaf spring unit 100 made of the composite material may reduce the occurrence of defects caused by corrosion caused by fatigue destruction or winter salt moisture, and the leaf spring unit 100 contributes to a reduction in weight, which may improve the fuel efficiency of the vehicle.

The impact absorbing units 200 are respectively coupled to two opposite ends of the leaf spring unit 100 and absorb impact occurring due to a motion of the leaf spring unit 100. The impact absorbing unit 200 is disposed to be accommodated in the lower arm support unit 300 mounted on a lower arm 400.

In the suspension system of the vehicle, the lower arm 400 is installed at a lower side of the vehicle and supports a knuckle. Rubber bushings and ball joints may be disposed on connection portions connected to the knuckle to reduce impact of a vehicle body and to allow free movements.

The impact absorbing unit 200 includes plate units 210, bushing units 220, and a fastening rod 230.

The plate unit 210 may be provided as a plurality of plate units 210, and the plurality of plate units 210 may be stacked on one another. The plurality of plate units 210 may be disposed to be spaced apart from one another, and the bushing units 220 may be disposed between the plate units 210. The plate unit 210 may include a metallic material such as steel or aluminum.

The plate units 210 may include a first plate 211 and a second plate 213. The first plate 211 and the second plate 213 may each be formed in a circular plate shape.

The second plate 213 is disposed above the first plate 211. The first plate 211 is disposed to be spaced apart from the second plate 213, and a first bushing 221 of the bushing unit 220 may be interposed between the first plate 211 and the second plate 213.

The plate unit 210 may further include a third plate 215. The third plate 215 is disposed above the second plate 213 and disposed to be spaced apart from the second plate 213. One surface of the plate unit 210 (an upper side of the plate unit based on FIGS. 2 to 4) may adjoin the leaf spring unit 100.

The first bushing 221 of the bushing unit 220 may be disposed between the first plate 211 and the second plate 213, and a second bushing 223 of the bushing unit 220 may be disposed between the second plate 213 and the third plate 215.

Outer diameters of the first plate 211 and the second plate 213 may be larger than an outer diameter of the first bushing 221, and outer diameters of the second plate 213 and the third plate 215 may be larger than an outer diameter of the second bushing 223.

The first plate 211, the second plate 213, and the third plate 215 may each include a metallic material such as steel and aluminum. Therefore, the first plate 211, the second plate 213, and the third plate 215 may each ensure rigidity having a predetermined value or higher.

The bushing unit 220 is disposed between the adjacent plate units 210 and absorbs impact. The bushing unit 220 may include an elastically deformable material. For example, the bushing unit 220 may include rubber, silicone, and the like.

The bushing unit 220 is elastically deformed by force (impact) generated by the motion of the leaf spring unit 100 and transmitted through the plate unit 210. The bushing unit 220 may be elastically deformed and thus reduce impact while absorbing displacement, e.g., transverse displacement of the leaf spring unit 100, thereby improving the stability of the vehicle.

The bushing unit 220 may include the first bushing 221 and the second bushing 223.

The first bushing 221 may be formed in a cylindrical shape and disposed between the first plate 211 and the second plate 213. The first bushing 221 is mounted on the lower arm support unit 300. The first bushing 221 may absorb or reduce the transverse displacement and transverse force generated by the motion of the leaf spring unit 100, thereby increasing the spring performance of the leaf spring unit 100 and improving the stability of the vehicle.

The second bushing 223 may be formed in a cylindrical shape and disposed between the second plate 213 and the third plate 215. The second bushing 223 may absorb or reduce the transverse displacement and transverse force generated by the motion of the leaf spring unit 100, thereby increasing the spring performance of the leaf spring unit 100 and improving the stability of the vehicle.

The first bushing 221 is accommodated in an internal space of a lower arm support body part 310 of the lower arm support unit 300. The first bushing 221 may be press-fitted and coupled into the lower arm support body part 310 of the lower arm support unit 300.

An outer diameter L4 of the first bushing 221 may be smaller than outer diameters L1 and L2 of the first plate 211 and the second plate 213. An outer diameter L5 of the second bushing 223 may be smaller than outer diameters L2 and L3 of the second plate 213 and the third plate 215.

The first bushing 221 and the second bushing 223 may each include an elastically deformable material. For example, the first bushing 221 and the second bushing 223 may each include rubber, silicone, and the like. Therefore, the first bushing 221 and the second bushing 223 may absorb or reduce the transverse displacement and transverse force generated by the motion of the leaf spring unit 100.

The first plate 211, the first bushing 221, and the second plate 213 are sequentially stacked. Therefore, it is possible to absorb or reduce the load and displacement of the leaf spring unit 100, transmitted to the first bushing 221 disposed between the first plate 211 and the second plate 213, relative to the vertical motion of the leaf spring unit 100.

The second plate 213, the second bushing 223, and the third plate 215 are sequentially stacked. Therefore, it is possible to absorb or reduce the load and displacement of the leaf spring unit 100, transmitted to the second bushing 223 disposed between the second plate 213 and the third plate 215, relative to the vertical motion of the leaf spring unit 100.

A height H1 of the first bushing 221 may be equal to or greater than a height H2 of the lower arm 400.

When the height H1 of the first bushing 221 is equal to the height H2 of the lower arm 400, the motion of the first plate 211 and the motion of the second plate 213 are restricted, and the third plate 215 may be moved vertically. Therefore, the second bushing 223 may absorb or reduce the load and displacement of the leaf spring unit 100 and the first plate 211 and the second plate 213 may stably support the motion of the leaf spring unit 100.

When the height H1 of the first bushing 221 is greater than the height H2 of the lower arm 400, the first plate 211, the second plate 213, and the third plate 215 may be moved vertically. Therefore, the first bushing 221 and the second bushing 223 may absorb or reduce the load and displacement of the leaf spring unit 100.

The plate unit 210 may include the first plate 211 and the second plate 213, and the first bushing 221 may be disposed between the first plate 211 and the second plate 213.

In addition, the plate unit 210 may include the first plate 211, the second plate 213, and the third plate 215, the first bushing 221 may be disposed between the first plate 211 and the second plate 213, and the second bushing 223 may be disposed between the second plate 213 and the third plate 215.

In addition, the plate unit 210 may further include a fourth plate (not illustrated) disposed above the third plate 215, and a third bushing (not illustrated) may be disposed between the third plate 215 and the fourth plate.

As described above, the number of plate units 210 and the number of bushing units 220 may be increased or decreased in consideration of the transverse displacement and transverse force of the leaf spring unit 100.

The fastening rod 230 penetrates the plate unit 210, the bushing unit 220, and the leaf spring unit 100. The fastening rod 230 may be formed in a long rod shape. An end portion of the fastening rod 230 penetrating the leaf spring unit 100 may have a stepped portion that prevents the separation of the leaf spring unit 100 and the like. In this embodiment, a screw thread is formed at the end portion of the fastening rod 230 and screw-coupled to a stopper 240.

The fastening rod 230 penetrates the first plate 211, the first bushing 221, the second plate 213, the second bushing 223, and the third plate 215 sequentially or in reverse order.

The impact absorbing unit 200 may further include the stopper 240. The stopper 240 is mounted on the fastening rod 230 and severs to prevent the leaf spring unit 100 from separating from the plate unit 210. A screw thread corresponding to the screw thread of the fastening rod 230 may be formed on an inner surface of the stopper 240.

The leaf spring unit 100 is disposed between the stopper 240 and the outermost plate of the plate unit 210, i.e., the third plate 215 in the present embodiment. In the state in which the fastening rod 230 penetrates the leaf spring unit 100 and the leaf spring unit 100 is disposed above the third plate 215, the stopper 240 may be coupled to the fastening rod 230 and prevent the leaf spring unit 100 from separating from the fastening rod 230. The stopper 240 may be screw-fastened to the fastening rod 230 and easily fastened or separated.

The lower arm support unit 300 accommodates the impact absorbing unit 200 therein and is mounted on the lower arm 400. The lower arm support unit 300 may include the lower arm support body part 310 and opening parts 320.

The lower arm support body part 310 is mounted on the lower arm 400 and accommodates the first bushing 221 therein. The lower arm support body part 310 may be press-fitted and coupled into the lower arm 400. The lower arm support body part 310 may be press-fitted and coupled into the lower arm 400, which makes it possible to shorten the assembling time, simplify the working process, and increase coupling strength.

The lower arm support body part 310 may include a bushing accommodation part 311 and bushing support parts 313. The bushing accommodation part 311 may be formed as a through-hole at the center of the lower arm support body part 310 and configured to accommodate the first bushing 221 therein. An inner diameter D2 of the bushing accommodation part 311 may be equal to the outer diameter L4 of the first bushing 221 or smaller than the outer diameter L4 of the first bushing 221. Therefore, when the first bushing 221 is disposed to be accommodated in the bushing accommodation part 311, the first bushing 221 is not separated from the bushing accommodation part 311. The first bushing 221 may be press-fitted and coupled into an inner circumferential surface of the bushing accommodation part 311.

The bushing support part 313 is provided as a pair of bushing support parts 313 concavely formed between the bushing accommodation part 311 and the opening part 320 and configured to support a circumferential surface (a lateral surface) of the first bushing 221. The bushing support parts 313 may be formed between the opening parts 320 respectively formed at two opposite sides of the bushing accommodation part 311. That is, the bushing support parts 313 are formed between the bushing accommodation part 311 and the opening parts 320 and configured to close a part of each of the opening parts 320.

A distance D1 between the pair of bushing support parts 313 is smaller than a maximum inner diameter D2 of the bushing accommodation part 311 and a maximum inner diameter D3 of the opening part 320. That is, the bushing support part 313 may be formed in a pointed crest shape and disposed between the bushing accommodation part 311 and the opening part 320.

The bushing support part 313 is in contact with the circumferential surface of the first bushing 221 and configured to support the circumferential surface of the first bushing 221. The bushing support part 313 prevents the first bushing 221 from swaying leftward and rightward and separating from the bushing accommodation part 311.

The outer diameter L1 of the first plate 211 and the outer diameter L2 of the second plate 213 may each be larger than the maximum inner diameter D2 of the bushing accommodation part 311. Therefore, the first plate 211 and the second plate 213 are connected to the first bushing 221 mounted on the bushing accommodation part 311 by the fastening rod 230, which makes it possible to prevent the separation of the first and second plates 211 and 213 respectively disposed above and below the lower arm support body part 310.

The outer diameter L2 of the second plate 213 and the outer diameter L3 of the third plate 215 may be each larger than an outer diameter L5 of the second bushing 223.

An inner portion of the lower arm support body part 310 may include an elastically deformable material. The inner portion of the lower arm support body part 310 may include an elastically deformable material such as rubber or silicone and absorb and reduce impact of the leaf spring unit 100.

An outer portion of the lower arm support body part 310 may include a metallic material such as steel or aluminum. The outer portion of the lower arm support body part 310 may include a metallic material such as steel and aluminum and ensure the rigidity having a predetermined value or higher.

The opening parts 320 are connected to the bushing accommodation part 311. The opening parts 320 may be connected to the bushing accommodation part 311 at a plurality of points. In this embodiment, an example is described in which the opening parts 320 are connected to the bushing accommodation part 311 at two points. Therefore, as illustrated in FIG. 3, the two opening parts 320 are respectively disposed at and connected to the left and right sides of the bushing accommodation part 311, one opening part for each side, based on the bushing accommodation part 311.

When the first bushing 221 is accommodated in the bushing accommodation part 311, the left and right motions of the first bushing 221 are restricted by the bushing support parts 313. That is, the bushing support parts 313 disposed at the left and right sides of the first bushing 221 based on FIG. 5 are configured to maintain the position of the first bushing 221 while preventing the first bushing 221 from separating from the bushing accommodation part 311.

Thereafter, when the leaf spring unit 100 is displaced, for example, displaced transversely, the first bushing 221 is elastically deformed and absorbs the transverse displacement and transverse force of the leaf spring unit 100. In this case, the opening parts 320 disposed at two opposite sides of the bushing accommodation part 311 allow the transverse elastic deformation of the first bushing 221.

The bushing accommodation part 311 and the plurality of opening parts 320 may be disposed in parallel with one another. The bushing accommodation part 311 and the plurality of opening parts 320 may be disposed in a direction parallel to the transverse motion of the leaf spring unit 100.

As described above, in the state in which the first bushing 221 is accommodated in the bushing accommodation part 311 by the bushing support parts 313, the first bushing 221 may be elastically deformed into a space ensured by the opening parts 320 and absorb the transverse displacement and transverse force of the leaf spring unit 100.

The opening part 320 may be formed in the lower arm support body part 310 and opened towards the outer surface of the first bushing 221. The opening part 320 may be formed to be opened in the lower arm support body part 310 and absorb and disperse impact transmitted to the leaf spring unit 100.

The plurality of opening parts 320 is disposed to be spaced from one another at predetermined intervals based on the first bushing 221. The opening parts 320 may be formed at the predetermined intervals, i.e., at equal intervals and uniformly disperse impact.

Hereinafter, an operation of the leaf spring device for a suspension system for a vehicle according to the embodiment of the present disclosure configured as described above will be described.

When the vehicle bumps because of the arc motions of the wheels, the transverse displacement and transverse force are applied to the inner side of the leaf spring unit 100 (downward and leftward based on FIG. 2). In this case, the plurality of plate units 210 and the plurality of bushing units 220 connected by the fastening rod 230 may absorb and reduce the impact generated by the transverse motion of the leaf spring unit 100. In addition, the lower arm support body part 310 and the opening part 320 of the lower arm support part 300 may absorb and reduce the transverse displacement and transverse force.

The load and displacement generated by the vertical motion of the leaf spring unit 100 and transmitted to the first bushing 221 and the second bushing 223 interposed between the first plate 211, the second plate 213, and the third plate 215 are absorbed and reduced. In addition, the load and transverse force of the leaf spring unit 100 may be absorbed and reduced by the lower arm support body part 310 and the opening part 320 of the lower arm support part 300.

According to the leaf spring device for a suspension system for a vehicle according to the present disclosure, the impact absorbing unit 200 may absorb and reduce the transverse displacement of the leaf spring unit 100, thereby improving the stable performance of the vehicle.

In addition, according to the present disclosure, the transverse movement generated during the arc motion of the vehicle wheel may be absorbed by the combination of the plurality of plate units 210 and the plurality of bushing units 220 that are stacked, which makes it possible to maintain the stable performance of the leaf spring unit 100.

In addition, according to the present disclosure, the opening part 320 of the lower arm support unit 300 may absorb the displacement of the arc motion of the leaf spring unit 100, which makes it possible to maintain the stable performance of the leaf spring unit 100.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A leaf spring device for a suspension system for a vehicle, the leaf spring device comprising:
   a leaf spring unit;
   first and second impact absorbing units respectively coupled to opposite ends of the leaf spring unit and configured to absorb an impact generated by a motion of the leaf spring unit; and
   a lower arm support unit configured to accommodate the first and second impact absorbing units, the lower arm support unit being mounted on a lower arm.

2. A leaf spring device for a suspension system for a vehicle, the leaf spring device comprising:
   a leaf spring unit;
   an impact absorbing unit connected to the leaf spring unit and configured to absorb an impact generated by a motion of the leaf spring unit; and
   a lower arm support unit configured to accommodate the impact absorbing unit, the lower arm support unit being mounted on a lower arm, wherein
   the impact absorbing unit comprises:
   a plurality of plate units disposed to be stacked;
   one or more bushing units disposed between adjacent plate units of the plurality of plate units and mounted on the lower arm support unit; and a fastening rod configured to penetrate the plurality of plate units, the one or more bushing units, and the leaf spring unit.

3. The leaf spring device of claim 2, wherein the impact absorbing unit further comprises a stopper mounted on the fastening rod and configured to prevent the leaf spring unit from separating from the fastening rod.

4. The leaf spring device of claim 2, wherein the plurality of the plate units comprises:
a first plate; and
a second plate disposed above the first plate and spaced apart from the first plate, and
wherein the one or more bushing units comprise a first bushing disposed between the first plate and the second plate.

5. The leaf spring device of claim 4, wherein the plurality of plate units further comprises a third plate disposed above the second plate and spaced apart from the second plate, the third plate being configured to come into contact with the leaf spring unit, and
wherein the one or more bushing units further comprise a second bushing disposed between the second plate and the third plate.

6. The leaf spring device of claim 5, wherein a height of the first bushing is equal to or greater than a height of the lower arm.

7. The leaf spring device of claim 4, wherein the lower arm support unit comprises:
a lower arm support body part mounted on the lower arm and comprising a bushing accommodation part provided therein, the bushing accommodation part being configured to accommodate the first bushing; and
an opening part formed in the lower arm support body part and opened to an outside of the bushing accommodation part.

8. The leaf spring device of claim 7, wherein the lower arm support body part further comprises a pair of bushing support parts, the pair of bushing support parts being concavely formed between the bushing accommodation part and the opening part and configured to support a circumferential surface of the first bushing.

9. The leaf spring device of claim 8, wherein a distance between the pair of bushing support parts facing each other is smaller than a maximum inner diameter of the bushing accommodation part and a maximum inner diameter of the opening part.

10. The leaf spring device of claim 8, wherein an outer diameter of the first plate and an outer diameter of the second plate are larger than a maximum inner diameter of the bushing accommodation part.

11. The leaf spring device of claim 7, wherein the opening part is formed as a plurality of opening parts, and
wherein the plurality of opening parts are disposed to face each other to enclose the bushing accommodation part.

12. The leaf spring device of claim 7, wherein the first bushing is elastically deformable toward the opening part in a state in which the first bushing is accommodated in the bushing accommodation part.

13. The leaf spring device of claim 7, wherein an inner portion of the lower arm support body part comprises an elastically deformable material.

14. The leaf spring device of claim 7, wherein an outer portion of the lower arm support body part comprises a metallic material, and
wherein the outer portion is coupled to the lower arm.

15. The leaf spring device of claim 2, wherein the plurality of plate units comprise a metallic material, and
wherein the one or more bushing units comprise an elastically deformable material.

\* \* \* \* \*